US012783053B2

(12) United States Patent
Shultz et al.

(10) Patent No.: US 12,783,053 B2
(45) Date of Patent: Nov. 3, 2026

(54) SYSTEM AND METHOD FOR AN INTERACTION SURFACE WITH SHAPE-CHANGING TACTILE ELEMENTS

(71) Applicant: Carnegie Mellon University, Pittsburgh, PA (US)

(72) Inventors: Craig D. Shultz, Pittsburgh, PA (US); Christopher Harrison, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/684,036

(22) PCT Filed: Aug. 16, 2022

(86) PCT No.: PCT/US2022/040514
§ 371 (c)(1),
(2) Date: Feb. 15, 2024

(87) PCT Pub. No.: WO2023/023095
PCT Pub. Date: Feb. 23, 2023

(65) Prior Publication Data

US 2025/0028394 A1 Jan. 23, 2025

Related U.S. Application Data

(60) Provisional application No. 63/233,523, filed on Aug. 16, 2021.

(51) Int. Cl.
*G06F 3/01* (2006.01)

(52) U.S. Cl.
CPC .................................... *G06F 3/016* (2013.01)

(58) Field of Classification Search
None
See application file for complete search history.

(56) References Cited

U.S. PATENT DOCUMENTS

| | | | | |
|---|---|---|---|---|
| 5,879,632 | A * | 3/1999 | Demers | B01L 3/0268 204/600 |
| 8,547,339 | B2 | 10/2013 | Ciesla | |
| 9,557,439 | B2 | 1/2017 | Wilson et al. | |
| 9,898,903 | B2 | 2/2018 | Khoshkava et al. | |
| 10,642,356 | B1 | 5/2020 | Wang et al. | |
| 10,991,269 | B2 | 4/2021 | Russomanno et al. | |
| 10,996,756 | B1 | 5/2021 | Ahne et al. | |
| 2005/0016715 | A1 | 1/2005 | Werner et al. | |
| 2011/0018813 | A1 | 1/2011 | Kruglick | |
| 2015/0253853 | A1 | 9/2015 | Yairi et al. | |

(Continued)

OTHER PUBLICATIONS

International Search Report and Written Opinion of the International Searching Authority for PCT Application PCT/US2022/040514 dated Oct. 26, 2022.

*Primary Examiner* — Carl Adams
(74) *Attorney, Agent, or Firm* — Michael G. Monyok

(57) ABSTRACT

A tactile interaction device uses a plurality of shape-changing tactile elements that are driven by electro-osmotic flow of a fluid. An electric filed applied to a pumping membrane by two electrodes is responsible for inducing a flow of the liquid. Multiple tactile elements can be used on the device to permit localized tactile feedback to a user. The device is adapted to be in contact with the user's skin, such as a finger or hand.

17 Claims, 5 Drawing Sheets

(56) References Cited

U.S. PATENT DOCUMENTS

| | | | | |
|---|---|---|---|---|
| 2016/0258428 | A1 | 9/2016 | Okumura et al. | |
| 2017/0068318 | A1* | 3/2017 | McClure | G06F 3/016 |
| 2020/0123001 | A1* | 4/2020 | Marsh | H10N 30/2047 |
| 2022/0171502 | A1* | 6/2022 | Dai | G01L 1/146 |

* cited by examiner

SYSTEM AND METHOD FOR AN INTERACTION SURFACE WITH SHAPE-CHANGING TACTILE ELEMENTS

CROSS-REFERENCE TO RELATED APPLICATIONS

This application claims the benefit under 35 U.S.C. § 119 of U.S. Provisional Application Ser. No. 63/233,523, filed on Aug. 16, 2021, which is incorporated herein by reference.

STATEMENT REGARDING FEDERALLY SPONSORED RESEARCH

Not applicable.

BACKGROUND OF THE INVENTION

The present disclosure generally relates to tactile technology for human/computer interfaces. More specifically, the disclosure relates to a shape-changing tactile device that can be used to provide tactile feedback to a user as they interact with a computer, phone, tablet, or other device.

The proliferation of high fidelity visual and audio experiences in modern digital communication devices has driven the capabilities of these devices. Laptops, tablets, smartphones, and now, virtual and augmented reality headsets, can achieve greater visual and audio reproduction than is easily discernible by human perception. Meanwhile, the cost and other barriers to entry for these devices have come down, leading to a revolution in the way we interact with technology and media content.

One area that has been left relatively unexplored, however, is tactile feedback. Devices employing tactile feedback couple to the skin mechanically, through the application of forces, vibrations, pressure, stretch, and other mechanical signals. Reproducing realistic and compelling haptic experiences in an inexpensive and mass-produced way has so far eluded manufacturers. This is because the skin, unlike the eye or the ear, is a sensing organ that is distributed all over the body. There are over 250,000 mechanical nerve endings distributed around the body, with the highest concentrations on the hands, fingertips, and lips. This distribution makes actuating these human sensors, and communicating to them via an interface, a difficult problem. It is advantageous for there to be an equal proliferation of actuation elements that communicate with the user's tactile sense in a manner that is meaningful and tailored to the specifics of human tactile capabilities.

Previous approaches to solve this tactile actuation problem often used a vibrating structure. Humans have the ability to sense very small vibration amplitudes, however the issue with sensitive vibration is that it is not a localized ability. Vibration actuators send stimuli into the body broadly and cannot control where it goes from there. This leads to global, not local, targeted actuation, as hundreds or thousands of vibrations receptors in the body may be activated by the same signal. This limits the fidelity of haptic experience that vibration actuators can render.

To achieve targeted tactile actuation, some techniques use arrays of small pins, which indent into the skin and cause local skin stretch and deformation. This manner of tactile stimulation, by creating a change in physical shape, is more conducive to reproducing high fidelity tactile experiences. Simply put, the way humans interact and sense most objects and surfaces in the environment is through cutaneous sensations of shape which are impressed on the skin when the skin comes in contact with those objects and surfaces. The ability to change the shape that is impressed upon the skin, therefore, is of high utility for a designer of human computer interfaces.

Attempts have been made to actuate a surface to adjust its shape for tactile purposes. The capabilities of the device are defined by the mechanical properties of the surface, and the abilities of the actuator driving the surface. Approaches using piezoelectrics, shape-memory polymers, electro-active polymers, and other solid phase materials all have one common drawback, a limited ability to produce strain. Solid materials are, by their very nature, difficult to change in shape, and the level of deformation needed for the change in shape to be tactually sensed is typically much larger than these solid materials can produce. For example, for an electro-active polymer achieving 1 percent strain and a deformation of 0.1 mm (a still relatively small displacement), the polymer must be 10 mm in length. This length is much too long and bulky to be integrated into a compact form factor which is required for many mass consumer applications. This strain restriction, therefore, presents a large barrier for all totally solid actuator materials.

Other prior systems use fluid actuation based on electro-osmosis. For example, U.S. Pat. No. 8,395,591 teaches the integration of a pump member which acts on the principle of electro-osmosis to inflate or deflate tactile cells, which can act as independent tactile actuators. This manner of pumping technology can be patterned and controlled using a conductive array of electrodes. This prior system, however, fails to teach how to create an electro-osmotic pump that is useful for the purposes of a tactile display suitable for delivering tactile feedback in contact with human skin.

Therefore, it would be advantageous to develop a tactile interface that overcomes these deficiencies and leads to much improved and desirable utility for commercial applications by providing a plurality of physically compact, embedded electro-osmotic pumps which are capable of producing a high pressure to displace a contacting appendage.

BRIEF SUMMARY

According to embodiments of the present disclosure is a device to enable tactile and/or haptic interfaces for human computer interaction. Further disclosed is a method for controlling microfluidic chambers for the purpose of tactile/haptic feedback in such interfaces. Example embodiments of the device include a single microfluidic tactile element comprising a pumping membrane, control electrodes, a power source, a working fluid, a touch surface, upper/lower chambers, and a housing. The liquid can be pumped through the pumping membrane to distend the upper chamber, which presents as a 'bump' on the touch surface. A method of creating a plurality of micro pumps in such microfluidic tactile elements is also disclosed, where each micro pump can be electronically addressed and controlled.

Example embodiments of the invention include large arrays of hundreds or thousands of tactile elements that can be located together on a single touch surface. These tactile elements can also be co-located with a visual display and a touch input surface to create a complete visual/haptic touch screen. This tactile device can be worn on the user to actuate the user's skin in a virtual reality application, for example. Aspects of the present invention allow much more practical fluidic haptic displays for human computer interaction.

DETAILED DESCRIPTION

Figure 1:
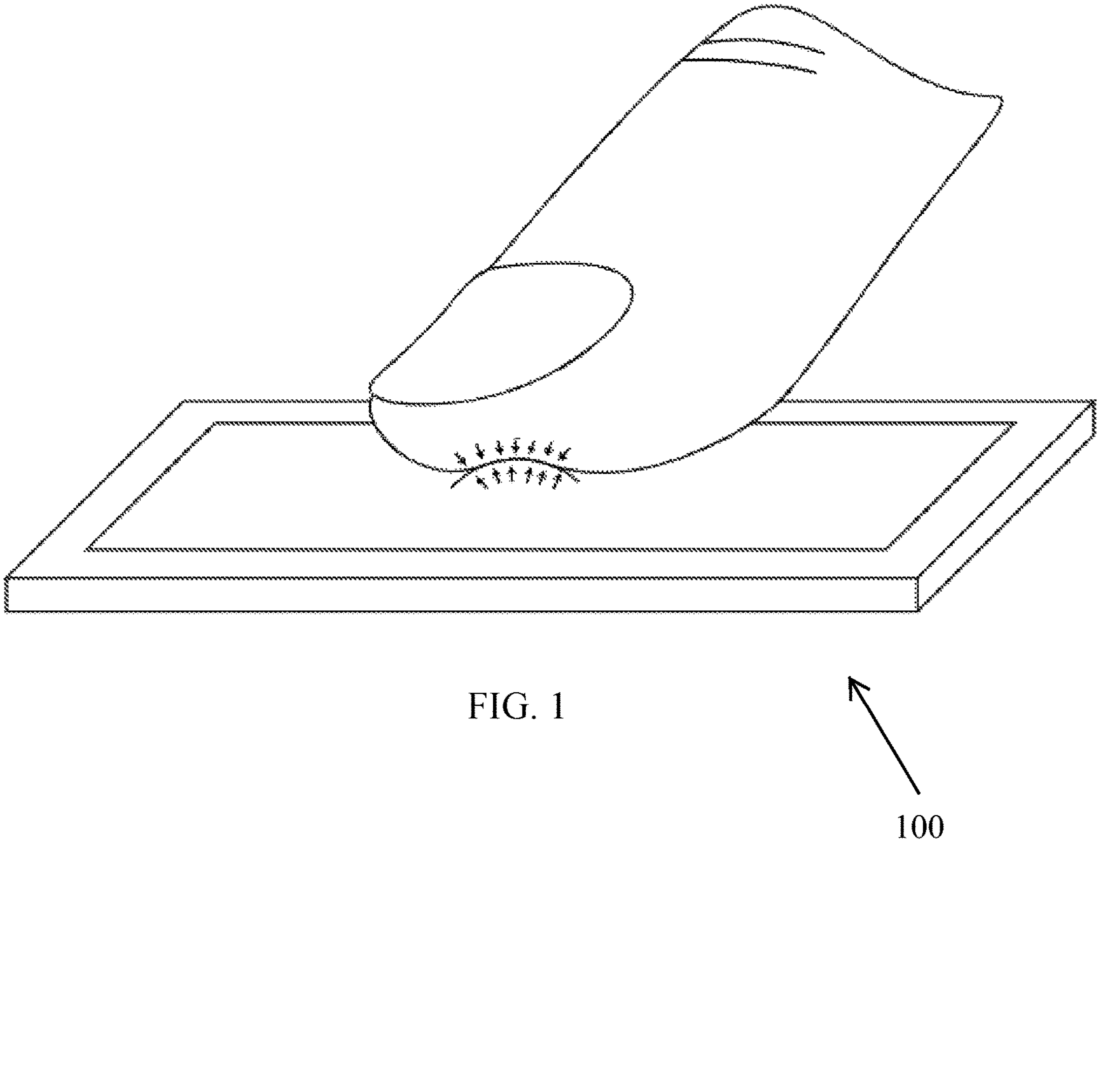
FIG. 1 depicts the tactile device according to one example embodiment.

According to embodiments of the disclosure is a tactile device 100 comprising a liquid-tight enclosure 110 with a plurality of chambers, including a first chamber 108 and a second chamber 109, into which a liquid 101 is transported using a pump 102. The pump 102 utilizes electro-osmosis, a pumping technique that induces fluid flow through the use of an electric field. In some embodiments, the pump 102 comprises a pumping membrane 107 separating two electrodes, including a first electrode 105 and a second electrode 106. In the embodiment shown in FIG. 1, at least a portion of the device 100 is adapted for contact with the human body, such as a fingertip. This portion of the device 100 is referred to as the contact surface 111 and can be displaced by fluid 101 pumped into the first chamber 108 from the second chamber 109.

Figure 2:
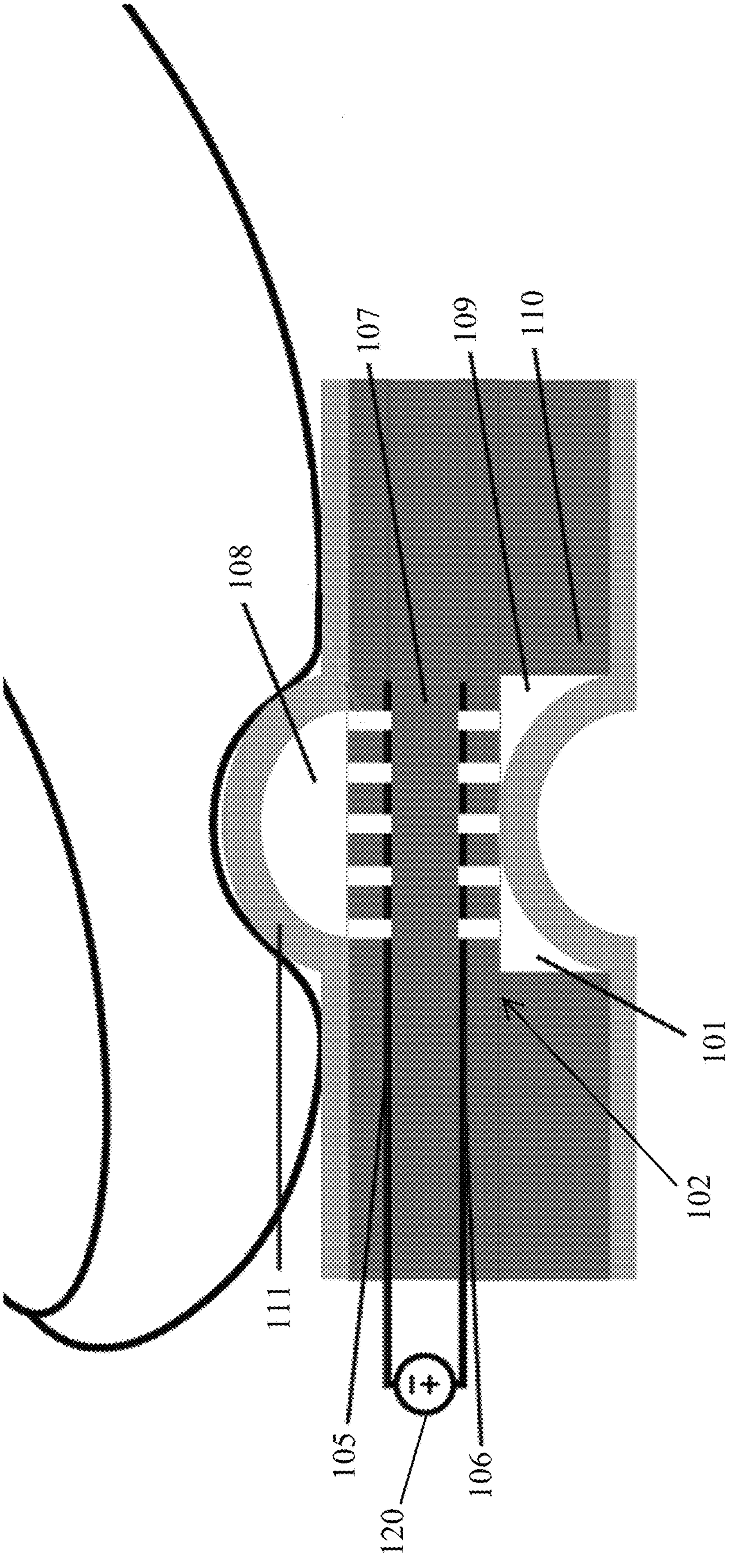
FIG. 2 shows the various components of the device.

FIG. 2 provides a more detailed view of the device 100. As shown in FIG. 2, the contact surface 111 is adjacent to the first chamber 108 and is able to conform to a displacement induced in the first chamber 108 by a change in the volume of the fluid 101 within the first chamber 108. The fluid 101 is pumped into the first chamber 108 from the second chamber 109 through the pumping membrane 107. Adjacent to the pumping membrane 107 is a first electrode 105 and a second electrode 106, with the two electrodes 105/106 positioned on opposite sides of the pumping membrane 107. An electrical source 120 is connected to each of the electrodes 105/106 and creates an electric field in the pumping membrane 107. Each of the pumping membrane 107, first electrode 105, and second electrode 106 may be porous or otherwise have passages to allow fluid to move from the second chamber 109 to the first chamber 108, or to move in the opposite direction when in the presence of a reversed electric field, for example.

The device 100 can reconfigure the shape of its contact surface 111 under computer control to communicate with the user tactically. This tactic communication is mediated by the various types of mechanoreceptive afferents that are embedded within human skin. These receptors detect different types of mechanical energy, such as strain energy when the skin is stretched. When the device 100 changes its surface shape, this causes a similar change in the shape in the contacting appendage, as the appendage is pressed against the contact surface 111 with a loading pressure. Mechanoreceptive afferents can detect the corresponding shape coming from the shape changing contact surface 111, resulting in a haptic perception by the user. This perception is usually described as a type of impressed image into the skin of the appendage, or is even felt directly as an applied pressure.

The ability of the contact surface 111 to change its shape while under mechanical load from the skin of an appendage, or, similarly, to maintain its shape once a pressure load is applied permits the device 100 to be used in a variety of communication protocols. Conversely, if a device were unable to maintain its shape, it would have a limited ability to render haptic content. For example, the contact surface would deflate once pressure from the user is applied and the shape-changing function would be eliminated. As a result, in one example embodiment of the device 100 the electro-osmotic pressure source used to enable the contact surface 111 shape change is sufficient to overcome typical pressures applied by the user's body.

Figure 3A:
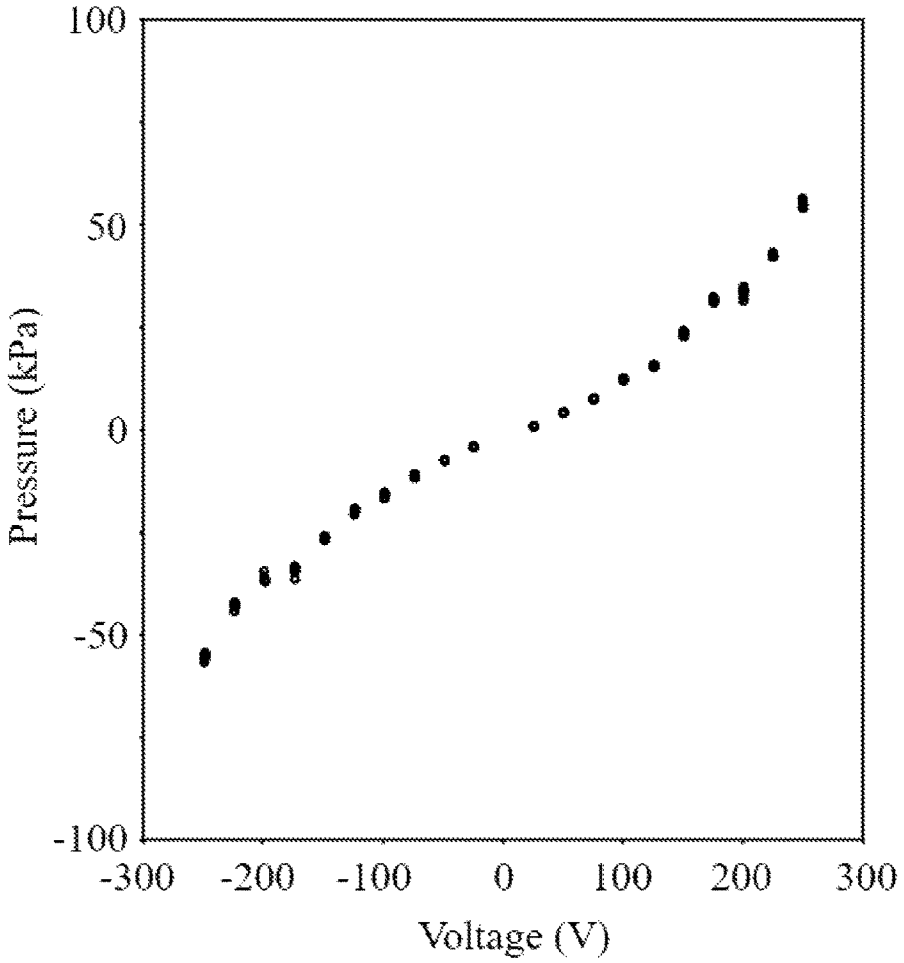
FIG. 3A is a graph showing pressures achieved at different voltages.
Figure 3B:
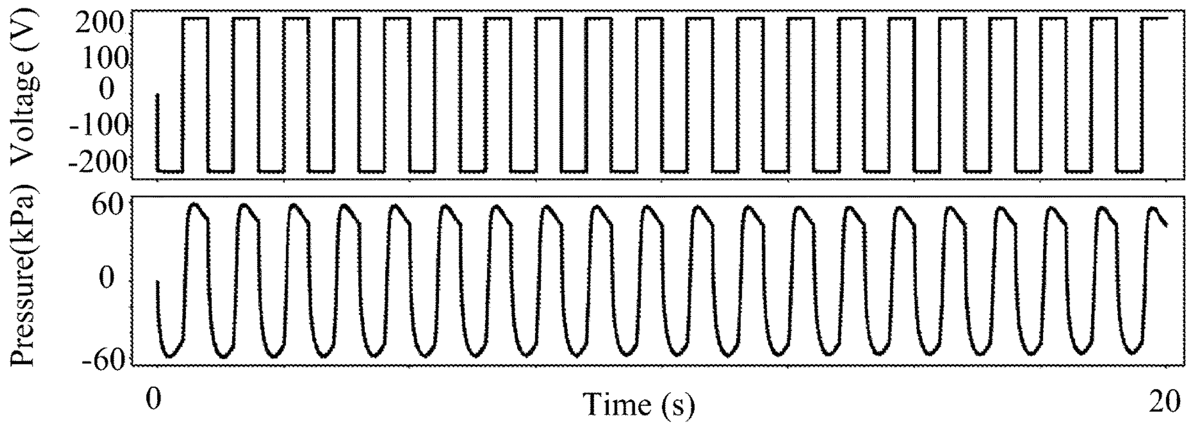
FIG. 3B is a graph showing the changes in pressure in response to changes in the voltage.

Typical pressures that deform the skin are in the range of 10 kPa. This corresponds to 1 Newton, applied to a 1 square centimeter of area of skin. This is generally the amount of pressure it takes until the surface of the skin conforms to whatever it is contacting. In the case of a flat surface, this is the pressure required to flatten 1 square centimeter of skin against the flat surface. In the case of the shape changing contact surface 111, this is the approximate minimum pressure the underlying tactile actuator must be able to produce to impose its shape upon the skin, and thus cause tactile sensation in the user. As shown in FIGS. 3A and 3B, which depict pressures exerted by the electro-osmotic pump 102 at different voltages, the device 100 is capable of producing pressures sufficient to deform human skin.

Figure 4A:
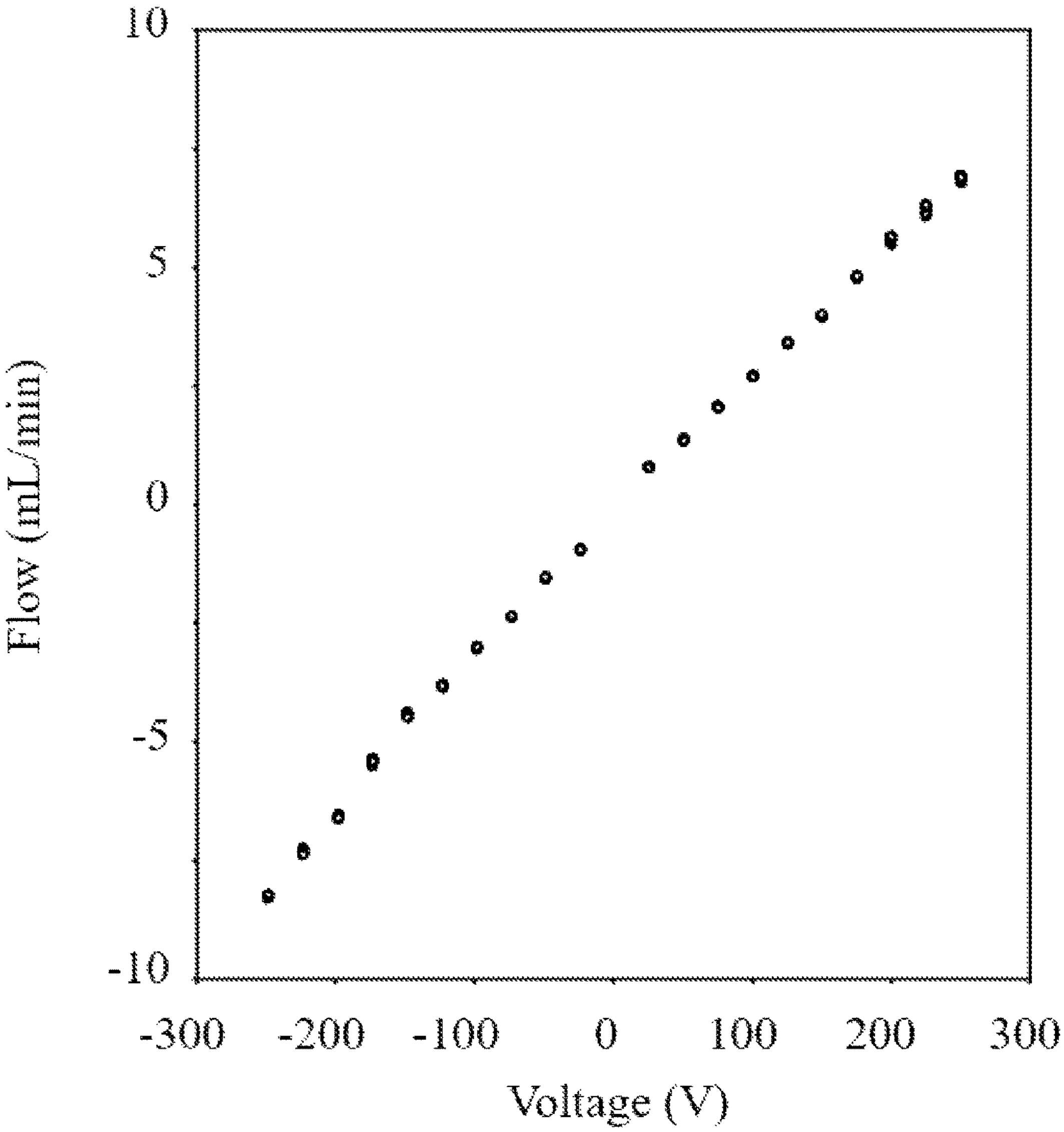
FIGS. 4A-4B are graphs showing flow rates at applied voltages.
Figure 4B:
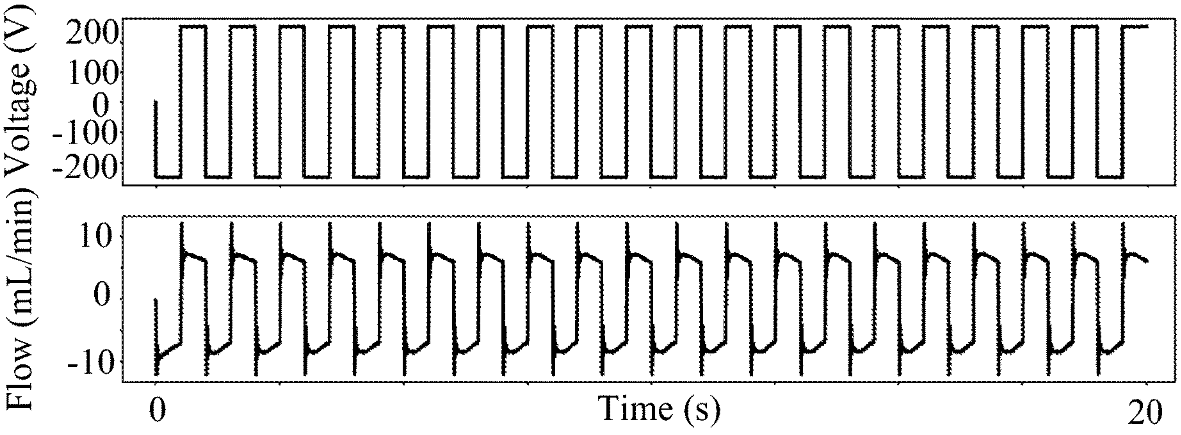

Pressure is one parameter to consider for a pumping source used for tactile actuation. Flow rates should be adequate to maximize the timeliness of the communication to the user. It is of limited use if the shape change ability only happens over the course of several seconds. In one embodiment, the device provides deformations on the order of 0.1 mm and occur within 100 ms. For a cylindrical shaped chamber having a 5 mm radius and extending by 0.1 mm in 100 ms, a liquid flow rate of approximately 5 ml/min is required. The compact electro-osmotic pumps 102 are able to achieve this level of flow, as seen in FIGS. 4A and 4B, which show the recorded flow rate for a 5 mm diameter pump 102.

The combination of pressure and flow rate achieved by the electro-osmotic pump 102 greatly increases the ability of a shape changing interface, fundamentally enabling its tactile functionality across a broad range of constraints. While the mechanical output of the system is one consideration for the device 100, to have usability as a tactile interface it should also satisfy additional physical constraints. For example, when used as a human/computer interface, the device 100 should be compact and lightweight. Compact in this context means the amount of volume that the device 100 displaces is large compared to the volume of the device 100 itself. The device 100 should also be a self-contained, or closed, system and able to operate as a self-contained system for long periods of time. Power requirements should be reasonable. Because the device 100 is adapted for contact with a human user, it should be nominally non-toxic and environmentally safe. Finally, the device 100 should operate over a large range of environmental conditions. Prior art devices have failed to meet a number of these constraints, making them unsuitable for human/computer interfaces.

These constraints are generally at odds with pumps that provide high flow rate and high pressure output. For instance, in general, the geometry of electro-osmotic pumps allows their flow rate to scale with the area of the pumping membrane and their pressure to scale with the thickness and density of the pumping membrane. This, however, is contrary to the constraint that the device remains compact and lightweight. Flow rate and pressure can also be raised by increasing the voltage to the membrane, but this approach can lead to gaseous byproducts at the pump electrodes and a breakdown of the liquid material itself. For example, water used as the driving fluid, while producing significant pressures and flows, is incompatible with long term operating constraints. Introducing an electrolyte buffer to the driving liquid may also increase pressure and flow, but does not eliminate gas production. In addition, increasing the flow rate and pressure also results in an increase in joule heating, electrical energy which is directly converted into thermal energy without performing any mechanical work.

The present device 100 is capable of delivering sufficient pressures and flows to enable the haptic capability while satisfying the above constraints. In one example embodiment, the device 100 accomplishes this through the use of a liquid 101 and electrode combination which allows a high electric field to be applied without significant bubbling or breakdown of the liquid 101.

Referring again to FIG. 2, the device 100 comprises a first electrode 105 and a second electrode 106 which are located on either side of a porous pumping membrane 107, a first chamber 108, which is mechanically coupled to the contact surface 111, and a second chamber 109, which is located on the opposite side of the porous pumping membrane 107 from the first electrode 108. A liquid 101 is injected into the device during production to fill the first chamber 108 and second chamber 109, as well as the porous pumping membrane 107 and all connecting areas, forming a closed hydraulic system. It should be understood that the majority of the air and other gasses are displaced inside the device 100 during the injection of this liquid 101.

The application of an electrical power source between the first electrode 105 and second electrode 106 creates an electric field within the porous pumping membrane 107. The electric field acts on local charge that has been polarized or drawn towards the walls of the porous membrane 107 by means of an electrochemical surface potential that exists between the liquid 101 bulk and the surface of the porous pumping membrane 107. This is the electrochemical double layer charge, which is inherent in the solid-liquid interface. The applied electric field leads to a coulombic force felt by the double layer charge causing the charge to accelerate. This acceleration is coupled to the surrounding liquid 101 via viscous interactions which, in turn, causes the entire bulk of the liquid 101 to flow. This induced flow causes liquid 101 to travel from the second chamber 109 (or reserve chamber) into the first chamber 108 (or tactile chamber). As this occurs the volume in the first chamber 108 increases, causing a change in shape in the first chamber 108. When the first chamber 108 is in contact with the skin of a user, this change in shape is then transmitted to the skin of the user via the increased hydraulic pressure contained within the first chamber 108. The change in shape is felt haptically by strain sensitive mechanoreceptors in the skin. It should also be appreciated that a reversal of the polarity of the electrical power source 120 will cause the reverse flow to occur, and liquid 101 will be transported from the first chamber 108 into the second chamber 109.

As long as the electrical power source 120 remains applied, the volume and pressure in the first chamber 108 continues to increase. However, as this occurs, a counter flow begins to occur in the porous pumping membrane 107 which reduces the total net flow. This counter flow is proportional to the counter pressure that is applied to the first chamber 108, either by the elastic force of the first chamber walls, the contact surface 111, or via the applied pressure coming from the user's skin. The ratio of the electro-osmotically driven flow and the pressure driven counter-flow defines the amount of change of volume, or shape, that the first chamber 108 is capable of. This, in turn, defines the quality of the tactile stimulus that is felt by the skin. It is therefore not sufficient that the shape changing interface of the device 100 only be able to produce fast liquid flows. It must produce enough hydraulic pressure to balance the pressure coming from the skin. In this regime of operation, the contact surface's 111 primary function is not to define the shape of the output liquid 101, but to contain the liquid 101 and enable its coupling to the skin.

The pressure output of the electro-osmotic pump 102 is determined, in-part, by the configuration and amount of charge in the liquid 101, the surface chemistry of the pumping membrane 107, the dielectric constant of the liquid 101 (its ability to polarize), the pressure driven hydraulic resistance of the membrane 107, the available surface area of the membrane 107, and the applied magnitude of electric field applied to the liquid 101. Previously, electro-osmotic flow is sometimes achieved with low applied electric fields and high amounts of charge in the liquid 101 (i.e. buffered solutions), and other applications operate in this regime. Pressure is then increased by raising the hydraulic resistance of the membrane 107, usually by using a physically thicker membrane 107. Membrane 107 thickness on the order of 1-10 mm can be used for high pressure applications. However, a membrane thickness of several millimeters may not be suitable for tactile interfaces.

Instead of using thick membranes 107, the present device 100 utilizes a low charge density, non-aqueous (unbuffered) liquid 101 that is compatible with high pressure and flow electro-osmotic pumping using a compact pumping membrane 107. Using a non-aqueous liquid 101 means that the liquid 101 is not susceptible to electrolysis reactions at applied voltages above approximately 1.23V. This alleviates the issue of significant gas generation during pumping operation at higher electric fields. In addition, the use of a liquid 101 with a low charge density means that there is not an excessive amount of joule heating current which is converted to thermal energy and lost during operation, enabling grater pump 102 efficiency. As a result, the pump 102 is capable of producing sufficient mechanical power output for haptic applications. Many organic solvents can be manufactured and kept in their non-aqueous state using humidity impermeable materials, making them useful as the pumping liquid 101. For example, the pumping liquid 101 may comprise liquids such as acetone, methanol, isopropyl, and similar solvents as they are easy to procure and relatively non-toxic. Some carbonates, such as propylene carbonate and ethylene carbonate can also be used and may have wide temperature ranges in which they remain liquid, while remaining relatively non-toxic and easy to manufacture. These have the additional benefit of having high dielectric constant and low viscosity, on the same order as water. Mixtures of these non-aqueous liquids can also be used as the liquid 101, and may offer benefits of wider liquid windows, increased dielectric constant, and reduction in bulk electrical conductivity.

The non-aqueous and low conductivity nature of these liquids, taken together, can allow a high electric field to be applied to the pumping membrane 107 without significant chemical breakdown of the liquid 101. The applied electric field is a function of the applied voltage and the distance between the first electrode 105 and the second electrode 106—it is the voltage divided by the distance. In one embodiment, the applied electric field is approximately 200 kV/m to 1.3 MV/m, corresponding to 50-300V applied over a distance of 0.225 mm. Depending on the application and desired pressure/flow rate, other distances and electric fields can be used in the device 100.

The electrodes 105/106 also help to prevent gaseous generation and apply high electric fields to the pumping membrane 107. The distance between the electrodes 105/106 can be minimized to result in a higher electric field given an applied voltage. This means that the electrodes 105/106 can be pressed up directly against the pumping membrane 107. Although this configuration reduces the distance between electrodes 105/106, it may make it difficult to generate a spatially uniform electric field between the electrodes 105/106 and across the pumping membrane 107 while also allowing the flow of liquid 101 through them. Flow is permitted by creating holes or perforations in the electrodes 105/106. Whenever a hole is introduced, however, the electric field is reduced as there is no conductor present in the hole. To minimize the loss, the spatial size of the hole is kept to a minimum in some embodiments, especially with respect to the distance between the first electrode 105 and second electrode 106. If the hole size remains smaller than this separation distance, then the fringing fields of the first electrode 105 and second electrode 106 are able to fill in the electric field where the holes occur. Using the prior example of a 0.225 mm distance between the first electrode 105 and the second electrode 106, the holes should be smaller than 0.225 mm. While the size of the holes can be kept below a threshold to improve flow, the number of holes can be maximized to minimize the reduction in flow through the pump. For instance, a conductive mesh could be used as the pumping membrane 107, or another material with similar construction which allows a highly porous structure.

The electrode materials also affect the electro-osmotic pump 102 and can be adjusted depending on the additional constraints in the system. For example, where there is a greater concern for leakage current, the electrodes 105/106 can be passivated, so that Faradaic currents through the total electrochemical cell are minimized by disrupting many of the Faradaic reactions at the electrode/liquid interfaces. In one example embodiment, passivated electrodes 105/106 still are able to polarize the system's bound charge and small amounts of migrating free charges. Electrodes 105/106 can also be made more inert by the application of thin non-reactive conductors, such as gold, platinum, silver and other noble metals, conductive polymers, such as PEDOT:PSS, or conductive oxides, such as indium tin oxide.

The materials previously listed are suitable for the portions of the electrodes 105/106 that are in contact with the pumping liquid 101. An adjacent and electrically connected portion of the electrode 105/106 functions to route an electrical signal from the electrical power source 120 to the electro-osmotic pump 102. This portion of the electrode 105/106 can be any other type of electrical conductor which is suitable for system routing. For example, copper can be used and it can be coated with nickel, tin, gold, silver, platinum or other metals where it comes in contact with the working liquid 101. Other common electrode materials for routing are transparent conducting oxides, very fine metal meshes, silver nanowires, PEDOT:PSS, or carbon nanotube based layers. Patterning of these layers can be done as is common in the state of the art, via etching, laser ablating, chemically deactivating, and similar methods.

The electro-osmotic pumping membrane 107 may be made of a material which maximizes the zeta potential, or electrochemical surface potential between the liquid 101 and solid membrane 107 interface. Maximizing the zeta potential can lead to a more compact double layer surface charge layer, which in turn, leads to a greater pressure output from the electro-osmotic pump 102. One material that satisfies this characteristic is silicon dioxide. Silicon dioxide can be integrated into the pumping membrane 107 by fabricating the entire membrane 107 from a silicate base, such as borosilicate glass fibers which have been brought together to form a compact matrix. It can be deposited on top of another material as a functionalizing layer, such as $SiO_2$ deposited on top of a silicon etched structure. In general, the pumping membrane 107 can be made of an underlying structure that defines its geometry and mechanical properties, and a functionalizing material that defines its surface chemistry properties. The structure must be able to withstand the pressures applied from the first chamber 108 and second chamber 109 during routine operation without bursting or buckling.

Figure 5:
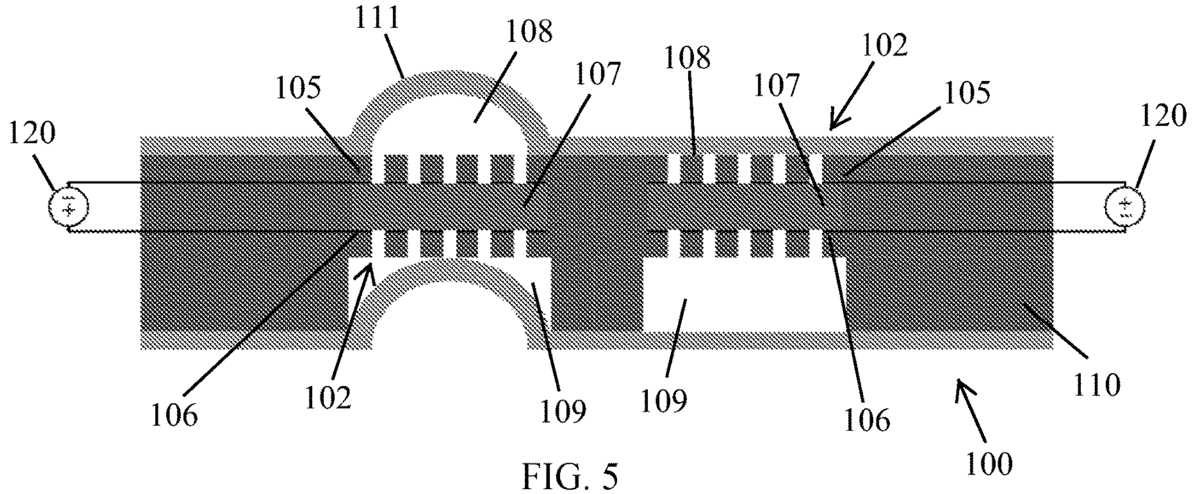
FIG. 5 is a device with a plurality of pumps capable of independent operation.

The first chamber 108 and second chamber 109 are coupled to the porous pumping membrane 107 by way of the first electrode 105 and second electrode 106, respectively. The first chamber 108 can be mechanically coupled to the optional output contact surface 111. Alternatively, the outside surface of the upper chamber 108 may function as the contact surface 111. Part of the first chamber 108 may be made of an elastic material that is able to deform under applied pressure. This allows the shape change of the contact surface 111 against the skin of an applied appendage. The elasticity of this structure can be adjusted to permit movement of the contact surface 111 into or away from the user. The elastic material can be made out of a highly elastic material, such as a silicone rubber, or an only moderately elastic material such as a thin polymer. The geometry of the chamber 108 can also be adjusted to allow for greater or lesser strain given an applied chamber pressure. The output contact surface 111 can be of the same area as the underlying porous tactile element (i.e. chambers 108/108 and pump 102), or it can be a larger or smaller area in order to adjust the flow rate into the first chamber 108 and onto the contact surface 111. This can allow for faster displacement of the contact surface 111, at the cost of lower surface area of displacement. The second chamber 109 can be made in a manner similar to the first chamber 108. In the case of multiple independent output contact surfaces 111, however, multiple second chamber 109 can be connected together to form a single chamber. This is not the case with multiple first chambers 108, which must remain independent of each other, with no hydraulic connections between them. FIG. 5 shows a device 100 with multiple pumps 102 and lower chambers 109 independent of each other. As shown in FIG. 5, the upper chamber 108 in the first tactile unit is extended while the upper chamber 108 in the second tactile unit is flat.

Connecting all of the previous elements together is the system housing, or enclosure 110. The housing 110 can be made of materials that are non-reactive to the pumping liquid 101, such as polymers, ceramics, glass epoxy laminates, or other similar materials. The housing 110 can be made stiff or be allowed to bend and conform its shape to the general shape of the appendage of the user to maximize nominal surface contact. Adhesives and other sealing layers can be integrated into the construction of the housing 110. The housing 110 encapsulates the rest of the interior surface area of the device 100 that is not encapsulated by the first chamber 108 and second chamber 109 walls. Together, the housing 110 and chamber 108/109 walls create a liquid-tight, closed system. Certain areas of the chamber 108/109 walls or housing 110 can be made to allow the slow diffusion of gasses, to help purge all gas from the interior of the device 100. Layers of material are typically processed to have a given geometry, for instance, by laser cutting, laser ablating, etching, or photolithography. These layers are then bound together using adhesive sheets, glues, or other adhesive techniques known in the art. For instance, in one embodiment, layers of acetal resin are cut and etched via laser ablation, and then adhered together using a silicone-based glue. In another embodiment, printed circuit boards form part of the housing 110 and are used to route the electrodes 105/106 and create the porous structure of the electrodes my means of drilling. These printed circuit boards are then laminated together using adhesive sheets which have been laser processed.

The electrical power source 120 can be an applied voltage or current source, and it can be capable of reversing its polarity. It need not be restricted to alternating current (AC) or direct current (DC) sources, but can be able to produce a wide range of applied voltages or currents. In some cases, it should be able to apply several hundred volts at low applied currents, generally under a few milliamps. In cases of large numbers of electro-osmotic pumps 102 being used, multiplexing of the power source 120 may be necessary, or the application of many power sources 120 may be necessary. In this case, the circuit could be designed to apply a unique controlling voltage or current to each electroosmotic pump 102, that is, to each set of control electrodes 105/106. Common techniques for controlling these large arrays of electrodes may be similar to LCD backplane technology. In this configuration, drive transistors (such as thin film transistors, TFTs) are distributed in the array itself, and controlled by clocking in various control signals from the edge. Other multiplexing techniques can also be used.

It should be understood that the device 100 is capable of communicating with a larger computing system, which can apply control of the system electrodes 105/106 according to other system inputs, as typical for other human interface devices. For example, the shape changing surfaces 11 of the device 100 can be integrated into a compact form underneath a flexible visual display, to form a combined visual and tactile output device 100. The visual display is thus integrated into the shape changing contact surface 111 and serves as part of the mechanical coupling between the first chamber 108 and the user's appendage. Using a plurality of these chambers 108, a full shape changing keyboard can be created which has elements that change their shape in response to increased pressure or touch coming from the user. In another embodiment, the compact shape changing interface 111 can be integrated into a worn garment with the surface 111 pressed up against the appendage at all times. This could allow the user to feel the shape of different virtual elements passing underneath their fingertips as they move their fingers and interact with a system sensing their hand and finger configuration.

When used in this specification and claims, the terms "comprises" and "comprising" and variations thereof mean that the specified features, steps, or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure. Although certain example embodiments of the invention have been described, the scope of the appended claims is not intended to be limited solely to these embodiments. The claims are to be construed literally, purposively, and/or to encompass equivalents.

What is claimed is:

1. A tactile interaction device comprising:
- a first electrode in fluid communication with a first chamber;
- a second electrode in fluid communication with a second chamber;
- a pumping membrane disposed between the first electrode and the second electrode, wherein the pumping membrane comprises a plurality of passages to permit fluid flow between the first chamber and the second chamber;
- a pumping liquid;
- an electrical source connected to the first electrode and the second electrode,
  - wherein the electrical source imparts an electric field across the pumping membrane,
  - wherein the pumping liquid has an electrical conductivity below a threshold where a breakdown of the pumping liquid begins for the given electric field, wherein the breakdown prohibits the pumping liquid from sustaining the electric field across the pumping membrane.

2. The tactile interaction device of claim 1, further comprising:
- a housing enclosing the first electrode, the second electrode, the first chamber, the second chamber, and the pumping membrane forming a liquid-tight, closed system to contain the pumping liquid.

3. The tactile interaction device of claim 2, wherein the housing is gas impermeable.

4. The tactile interaction device of claim 1, further comprising:
- a contact surface adjacent to the first chamber,
  - wherein the contact surface is adapted to deform in response to a change in volume of the pumping liquid present in the first chamber.

5. The tactile interaction device of claim 1, wherein a strength of the electric field is sufficiently high to create a pressure in the first chamber to displace a human appendage in contact with the first chamber.

6. The tactile interaction device of claim 1, wherein the pumping liquid is non-aqueous.

7. The tactile interaction device of claim 1, wherein the pumping liquid comprises an organic solvent.

8. The tactile interaction device of claim 1, wherein the pumping liquid is a solvent selected from a group consisting of acetone, methanol, isopropyl, propylene carbonate, ethylene carbonate, and mixtures thereof.

9. The tactile interaction device of claim 1, wherein at least one of the first electrode and the second electrode are coated by a noble metal.

10. The tactile interaction device of claim 1, wherein at least one of the first electrode and the second electrode are passivated.

11. The tactile interaction device of claim 1, wherein at least one of the first electrode and the second electrode are porous.

12. The tactile interaction device of claim 1, further comprising:
- at least one additional chamber in fluid communication with the second chamber.

13. The tactile interaction device of claim 1, further comprising:

a contact surface adjacent to the first chamber, wherein the contact surface transmits a displacement in the first chamber to a user.

14. The tactile interaction device of claim 1, wherein at least one of the first chamber and the second chamber are gas impermeable.

15. The tactile interaction device of claim 1, wherein the pumping membrane restricts flow from the first chamber into the second chamber.

16. The tactile interaction device of claim 1, wherein the electrical source is adapted to reverse polarity applied to the first electrode and the second electrode in order to reverse a flow of the liquid between the first chamber and the second chamber.

17. A tactile interaction device comprising:

a first electrode in fluid communication with a first chamber;

a second electrode in fluid communication with a second chamber, wherein a distance between the first electrode and the second electrode is maintained to produce an electric field of at least 200 kV/m for a voltage;

a pumping membrane disposed between the first electrode and the second electrode, wherein the pumping membrane comprises a plurality of passages to permit fluid flow between the first chamber and the second chamber;

a pumping liquid;

an electrical source connected to the first electrode and the second electrode, wherein the electrical source imparts the voltage to create an electric field across the pumping membrane.

* * * * *